(No Model.)
E. THIANGE.
LOCK NUT.
No. 561,923. Patented June 9, 1896.
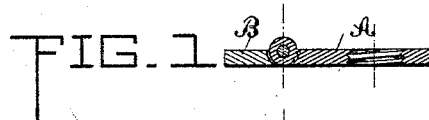
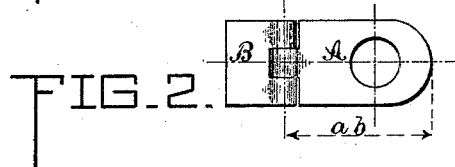
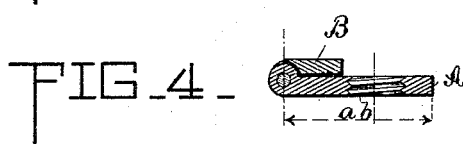
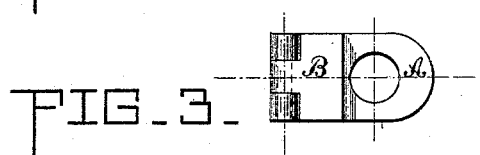
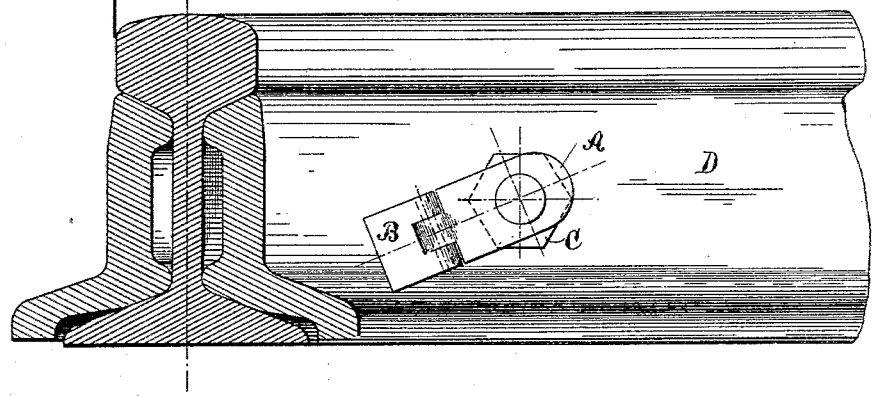
Witnesses.
W. Ellwood Allen.
Jas. W. White
Inventor.
Eduard Thiange.
By Knight Bros
Attorneys ent in what appears.

UNITED STATES PATENT OFFICE.

EDUARD THIANGE, OF BLOEMFONTEIN, ORANGE FREE STATE.

LOCK-NUT.

SPECIFICATION forming part of Letters Patent No. 561,923, dated June 9, 1896.

Application filed June 9, 1894. Serial No. 514,097. (No model.)

*To all whom it may concern:*

Be it known that I, EDUARD THIANGE, a citizen of Bloemfontein, Orange Free State, have invented new and useful Improvements in Lock-Nuts, of which the following is a specification.

The improved nut-lock which is the object of this present invention consists, substantially, of a second nut screwed over the first or principal nut and is arranged in a peculiar way—that is to say, so as to be held from unscrewing under the pressures exerted on the principal nut by being arrested against the edge of fish-plate in case of appliance of the improved arrangement to rails and the like.

In the annexed drawings, Figure 1 is a longitudinal section of the nut in the position shown in Fig. 2. Fig. 2 is a plan view of the nut-lock in operating position. Fig. 3 is a plan view of the nut-lock when folded for screwing. Fig. 4 is a section of the folded nut, and Fig. 5 shows the lock-nut applied to a fish-plate.

The principal or tie nut is an ordinary hexagonal or square nut which is screwed in place in the usual manner against the fish-plate and upon which the lock-nut is screwed afterward.

The lock-nut consists of two parts A and B, each of which is an elongated metal plate of suitable thickness. One of the parts, the half A, has a tapped opening to be screwed on the bolt the same way as the principal nut G, and the other half, B, is hinged to the part A in any suitable manner.

To screw the lock-nut onto its place, it is folded, as shown in Fig. 4, but when once in place it is laid open, as shown in Figs. 1, 2, and 5. In this position it will be easily seen that the nuts cannot unscrew, for the part B of the lock-nut is in this direction prevented from turning or rotating as it rests upon the projecting edge of the fish-plate, as shown by the arrow, and it will be readily seen that the lock-nut is made of two hinged parts in order to allow the passage over the edge when screwing down on the bolt, while this operation would be impossible if the lock-nut was made in its elongated form of one single part.

I claim—

The combination of the part to be secured, having a projecting portion, the bolt and nut for securing the same, and a locking-plate screwed on the bolt up against the nut by a threaded opening in one end, and formed in two jointed parts so proportioned that when folded upon itself it may turn about the bolt past the projecting portion of the part to be secured, but when unfolded will engage said projecting portion and prevent unscrewing substantially as set forth.

EDUARD THIANGE.

Witnesses:
HENRI FRANÇOIS,
LOUIS DELOSTON.